Sept. 5, 1950
C. C. SITTLER
2,521,548
TUBULAR ELECTROMAGNET POTENTIAL INDICATOR
Filed July 28, 1944
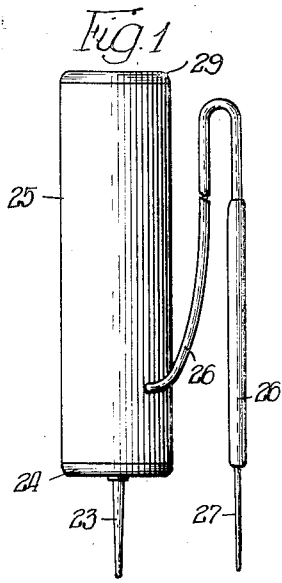
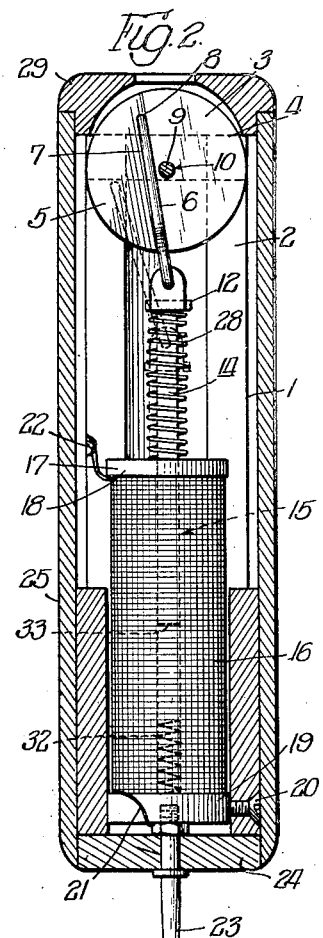
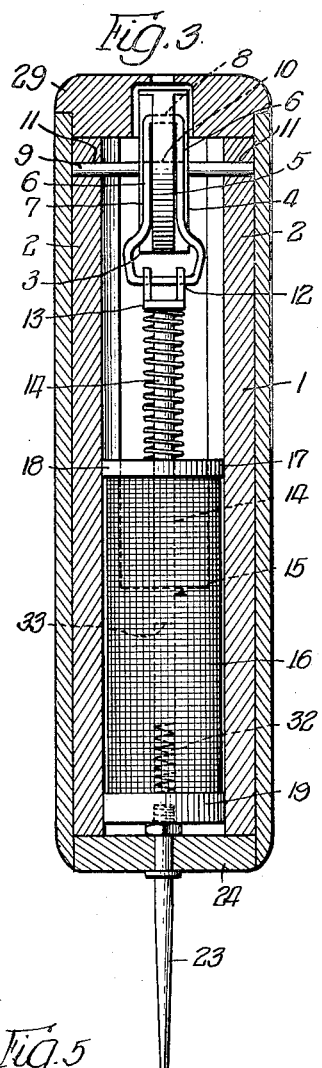
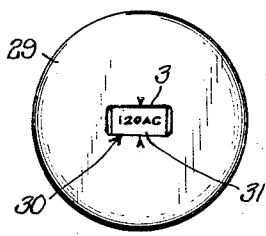
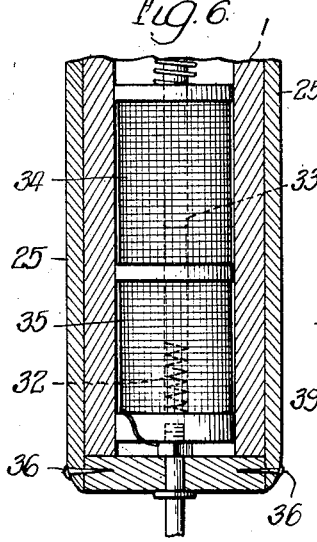
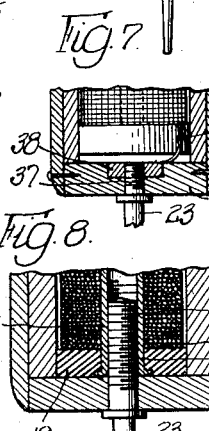
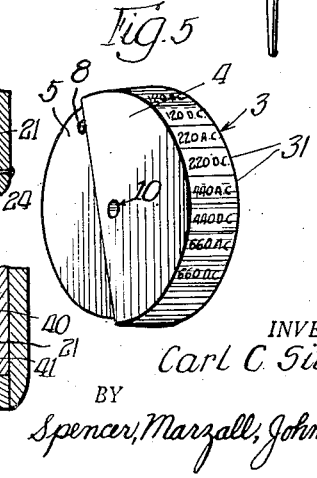
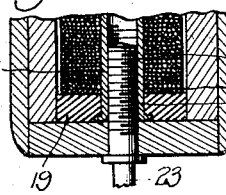
INVENTOR.
Carl C. Sittler,
BY
Spencer, Marzall, Johnston & Cook Patented Sept. 5, 1950

2,521,548

UNITED STATES PATENT OFFICE 2,521,548

TUBULAR ELECTROMAGNET POTENTIAL INDICATOR

Carl C. Sittler, Glen Ellyn, Ill.

Application July 28, 1944, Serial No. 547,060

4 Claims. (Cl. 171—95)

This invention relates to a potential indicator or voltage tester to indicate the voltage of electric lines.

There are numerous voltage testers with indicators in commercial use but most of them are cumbersome to handle, do not have the necessary requirements as to safety, and are incapable of being read easily and quickly.

The primary object of the present invention is to provide a new and improved potential indicator which can be applied or positioned easily and readily to the terminals of the line being tested, and the voltage indicated will be in plain sight of the person using the indicator or conducting the test.

Another important object is to provide a potential indicator or voltage tester of an improved form and of new and novel character whereby the operator or line tester may hold the body in one hand, and the extension in the other hand for making contact easily with the two contacts or lines to be tested, and while so holding the device may see at a glance the voltage registered on the indicator.

Further important objects of the invention reside in the provision of a device which freely and quickly tests a potential and determines substantially the voltage of both alternating and direct current, which is simple, compact and durable in construction, which has its indicator or indicating mechanism arranged in plain sight of the operator by locating the same at the top end of the casing or housing, which is composed of relatively few and simple parts and, therefore, is not likely to get out of order, which has a rigid prod or probe arranged rigidly at the lower end of the casing or housing with a second prod or probe at an end of a flexible conductor protruding from the casing or housing for quick and ready application to the terminals of a line to be tested, which is rigid and easily manipulated, and which may be manufactured readily at low cost.

Numerous other objects and advantages will be apparent throughout the progress of the specification which follows.

A selected embodiment of the invention is illustrated in the accompanying drawings wherein:

Fig. 1 is a detail elevational view of a potential indicator and embodying the invention;

Fig. 2 is a detail vertical sectional view on an enlarged scale;

Fig. 3 is a detail sectional view at right angles to Fig. 2;

Fig. 4 is a detail top plan view;

Fig. 5 is a detail perspective view of the indicator;

Fig. 6 is a detail sectional view showing a double coil or solenoid construction;

Fig. 7 is a detail sectional view showing one manner in which the rigid lower prod or probe may be electrically connected to the coil or solenoid; and Fig. 8 is a view similar to Fig. 7 but showing a modified form of probe or prod connection to the coil, the prod being threaded into the core of the coil.

The particular device herein shown for the purpose of illustrating the invention comprises an inner support or frame 1 of relatively cylindrical construction, being cut away at its upper end to provide spaced legs 2 to receive an indicator 3.

The indicator 3 is of relatively circular or disklike formation having a thickened part 4 and a thinner part 5, the thickened part 4 being somewhat more than half the area, as clearly shown in Fig. 5. The thinner portion 5 fits in between the spaced legs 6 of an operating member 7 which is pivotally mounted at 8 to the circular, disk-like indicator 3. The indicator 3 is revolubly mounted on a shaft or axis 9 which extends through an opening 10 in the indicator and engages and is supported at 11 by the legs 2 of the supporting structure 1, as clearly shown in Fig. 3. The operating member 7 is pivotally connected at 12 to a yoke 13 fixed to the upper end of a soft iron solenoid core 14. The solenoid core 14 operates in the central opening 15 of a solenoid coil 16. The solenoid coil 16 is wound upon a spool 17 of fiber or other conventional material and has upper and lower heads 18 and 19, respectively. The coil 16 may be retained in proper position by means of screws 20 passing through the lower cylindrical part of the supporting member 1 and engaging the lower head 19 of the coil, as clearly shown in Fig. 2.

The coil 16 is made up of enamelled magnet wire and has opposite leads 21 and 22, the leads 21 and 22 being the opposite ends of the wire of which the coil is made. One lead 21 is electrically connected to a rigid prod or probe 23 extending through the bottom cap 24, while the other lead 22 extends through an opening formed in the support 1 and through the device casing 25, the said lead 22 being electrically connected to a flexible conductor cord 26 having a prod or probe 27 electrically connected at its lower end, as clearly shown in Fig. 1.

A coil spring 28 is interposed between the head 18 of the coil 16 and the yoke 13 on the iron core 14 so as to urge the core in a predetermined position and return it to original position after it has been operated by electric energy. When the prods 23 and 27 are placed in electrical contacting engagement with the electrical contacts of the line being tested, the core 14 will be drawn downwardly in the usual manner and pull the member 7 downwardly against the tension of the spring 28, causing rotative movement of the circular indicator 3 about its pivot 9. A top 29 is operatively secured to the upper end of the casing 25, and this top has an elongated sight slot or area 30 through which the indicia member 31 on the indicator 3 may be seen. The indicia 31 is circumferentially arranged about the thickened portion 4 of the indicator member 3, as clearly shown in Fig. 5, the indicia being divided so as to indicate voltage for both direct and alternating current, the indicia being so arranged that the alternating current and the direct current may be shown directly through the opening 30 in the top 29.

The spring 32 is located in the opening in the coil at the bottom of the coil against which the bottom 33 of the iron core engages, whereby the range of the indicia or the scale may be accurately determined, the energization of the coil causing the core to move downwardly against the spring 32 whereupon the downward movement of the core will be limited by the spring 32, the spring creating an urging action upwardly against the downward movement of the core. The device, as shown, may have the scale or indicia 31 set for voltages from 110 volts or less to 660 volts more or less, determined by conditions. However, the present device is indicated as operating on a maximum line voltage of 660 volts. To reduce the danger to the operator and to the device should the coil develop a short circuit in its windings, as by insulation failure due to overloading or other reasons, it may be desirable to make the coil in two or more sections 34 and 35, as shown in Fig. 6. The sections may be mounted in alinement and electrically connected in series. In such arrangement the voltage across each section is much lower than the line voltage. Where two coils of identical size are used, each absorbs one-half of the line voltage, so that, if a short circuit develops in either section, the voltage across the injured section will be only half what it would be in a device built with a single coil. As a consequence, the effects of a short circuit in the device are considerably minimized in the multi-coil arrangement.

The outer casing 25 may support the upper and lower ends 29 and 24, respectively, in any convenient manner, such as by screws 36 passing through the outer casing 25, as shown in Fig. 6.

The lower rigid prod 23 may be screw threaded into the bottom cap 24, as shown in Fig. 7, the end of the prod 37 being screw threaded and engaging a nut 38 suitably embedded in the bottom cap 24, the lead 21 from the coil being electrically connected to the nut 38.

In Fig. 8 the lower prod 23 may have its upper end threaded, as indicated at 39, to engage threads 40 about the opening in the coil, the lead 21 being electrically connected to an extension 41 formed in the bottom member 19 of the coil.

The outer casing 25 and the outer caps 24 and 29 are made of insulating material such as fiber, although any other insulating material may be used; also, the supporting member 1 is preferably made of suitable insulating material.

The invention provides a simple, inexpensive, compact indicating device which can be easily handled and manipulated by the operator, and which can be read quickly and readily. In actual practice the operator holds the casing in one hand so that the prod 23 is in contact with one contact, and the prod 27 held in the other hand is put into engagement with another contact. The upper end of the device will then be facing the operator, whereupon the operator can read the indicia or scale quickly and readily. The invention further provides the use of a spring having an urging action against the downward movement of the core, as well as providing a safety feature in the device by the use of two separate coils hooked up in series.

The indicia 31 may be of luminous paint so that the same may be seen in the dark.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A potential indicator comprising a body, a disk member arranged in the upper part of the body, said disk member having a thick and a thin part, indicia peripherally arranged on the thick part of the disk to indicate certain voltages, means for rotatably mounting the disk on a horizontal axis, a solenoid including a pair of coils wound in series in the body, a core for said solenoid, an operating member having spaced arms operatively connected to the disk and between which arms the thin part of the disk is arranged, and a yoke on the core and operatively connected to the operating member whereby movement of the core will impart rotative movement to the disk member.

2. A potential indicator comprising a hollow tubular body, a disk member arranged inside the body at the upper end thereof and having a thick and a thin part, indicia on the thick part of the disk member to indicate certain voltages, means for rotatably mounting the disk member on a horizontal axis, a solenoid including a pair of coils wound in series in the body, a core for said solenoid, an operating member having spaced arms operatively connected to the disk member and between which arms the thin part of the disk is arranged, a yoke on the core and operatively connected to the operating member whereby movement of the core will impart rotative movement to the disk, a flexible conductor extending through the body near the lower end thereof and electrically connected to the solenoid, a prod at the end of the conductor, a rigid prod fastened to the body at the bottom thereof and electrically connected to said solenoid, and a top cap on the body in juxtaposition with respect to the thick part of the disk member, said cap having an opening therein through which certain of the indicia on the thick part of the disk member is visible.

3. A potential indicator comprising an elongated tubular body having a prod supporting bottom closure and a top closure having a sight area, an indicator pivoted in said body on an axis extending along a diameter thereof and having a portion adapted to be positioned for viewing through said sight area, a solenoid in the bottom of said body and adapted for connection to an electric circuit to be tested, a core slidable in said solenoid along the axis of said body, a head on said core, a helical spring surrounding said core outside of said solenoid and abutting the upper end thereof and the under side of said head and a link connecting said head with said indicator to actuate the latter as the core in drawn into the solenoid.

4. A voltage indicator comprising in combination, an elongated tube closed at the bottom, a top closure having a sight area centrally disposed therein, a supporting structure received in said tube, a solenoid coil carried by said structure at its lower end, a core slidable in said solenoid and having a portion extending above its upper end, a head on said core, a helical spring surrounding said portion and engaging said head and upper end, an indicator movable beneath said top closure for inspection through said sight area, a pivot for said indicator extending diametrically of said tube and carried by said support and a link connecting said head to said indicator so as to move the said indicator arcuately about its pivot.

CARL C. SITTLER.

REFERENCES CITED

The following references are of record in the file of this patent:

UNITED STATES PATENTS

| Number | Name | Date |
|---|---|---|
| 79,103 | Calvert | June 23, 1868 |
| 623,861 | Young | Apr. 25, 1899 |
| 1,148,218 | Clark | July 27, 1915 |
| 1,712,560 | Huggins | May 14, 1929 |
| 1,978,916 | Stolp et al. | Oct. 30, 1934 |
| 2,290,760 | Mehaffie | July 21, 1942 |
| 2,363,799 | Mahurin | Nov. 28, 1944 |
| 2,366,991 | Wich | Jan. 9, 1945 |
| 2,426,050 | Radwanski | Aug. 19, 1947 |

OTHER REFERENCES

Electrical Review, page 231, February 5, 1926.